W. C. SWEET.

REFRIGERATOR.

No. 10,992. Reissued Mar. 26, 1889.

*Witnesses:*

Walter E. Ward.

John N. Mayer

*Inventor:*

William C. Sweet.

per Frederick W. Cameron.

Attorney.

N. PETERS, Photo-Lithographer, Washington, D. C.

UNITED STATES PATENT OFFICE.

WILLIAM C. SWEET, OF SCHENECTADY, NEW YORK.

REFRIGERATOR.

SPECIFICATION forming part of Reissued Letters Patent No. 10,992, dated March 26, 1889.

Original No. 355,667, dated January 4, 1887. Application for reissue filed February 14, 1889. Serial No. 299,924.

*To all whom it may concern:*

Be it known that I, WILLIAM C. SWEET, a citizen of the United States, residing at the city of Schenectady, in the county of Schenectady and State of New York, have invented a new and useful Refrigerator, or Apparatus for Preserving Meats, &c., of which the following is a specification.

My invention relates to refrigerators; and it consists, first, in the combination, with a refrigerator having way or guide strips, of an ice-receptacle having rollers to travel thereon and a flexible pipe connecting the ice-receptacle with an eduction tube or opening in the refrigerator; and, secondly, in a refrigerator comprising a casing and a lining of light porous wood, arranged to leave a space between them, and a filling consisting of salt, lime, and sawdust in said space.

Figure 1:
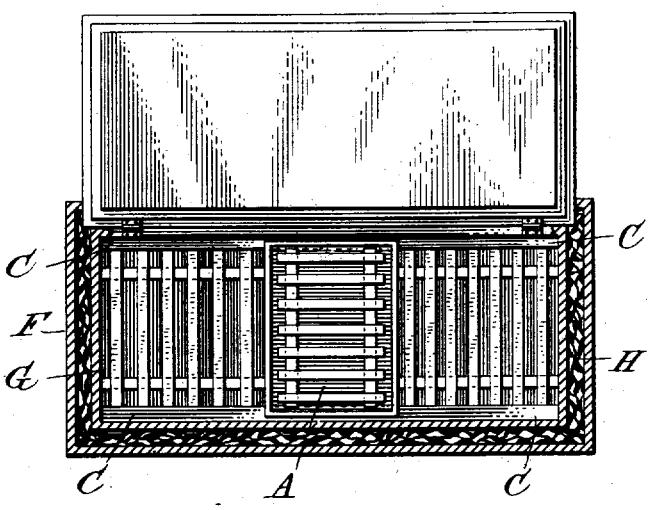
Figure 2:
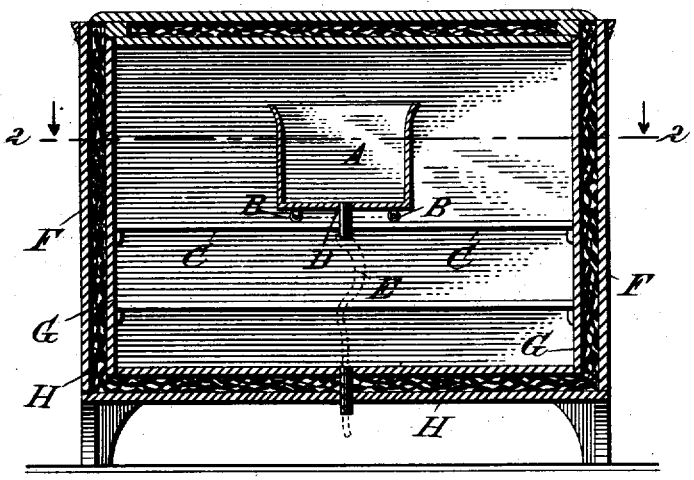

In the drawings, Figure 1 is a vertical section of my refrigerator, and Fig. 2 a horizontal section.

Similar letters refer to similar parts in each view.

To the bottom of the ice box or receptacle A are fastened the rollers B B, two at each end, which run upon the tracks or ledges C C, fastened to the sides of the refrigerator. From the bottom of the ice-box at D extends a short metal tube, over the lower end of which fits the flexible tube E, for carrying off the waste water. By this arrangement the ice-box can be readily moved from one end of the refrigerator to the other, giving great convenience in the storing of articles underneath it, and it can also be easily taken out of the refrigerator for cleansing. In cold weather, when ice is not needed, it can be left out entirely. The shelves, which are movable, rest upon ledges or cleats fastened to the sides, and can be readily adjusted so as to suit the size and number of the articles to be stored.

The sides, top, and bottom of the refrigerator consist of the casing F, the lining G, and the space H between the two, filled with a composition of sawdust, salt, and lime, preferably mixed in the following proportions, viz: In one barrel of sawdust I thoroughly mix four quarts of salt and four quarts of lime. The salt and lime may either be dissolved in water and the solution mixed with the sawdust, or they may be mixed in a dry state. As the object of this filling is to unite the non-conducting quality of the sawdust with the absorbent power of the salt and lime, it is obvious that the same effect will be produced by any mixture of these materials in substantially the proportions above mentioned, and I do not confine myself to these exact proportions.

I have no metal lining in my refrigerator, and there is no communication with the external air. The composition, acting through the lining G, which is made of light porous wood, absorbs the moisture and impurities in the air, and causes it to remain dry and wholesome.

What I claim, and desire to secure by Letters Patent of the United States, is—

1. The combination, with a refrigerator having way or guide strips, of an ice-receptacle having rollers to travel thereon, and a flexible pipe connecting the ice-receptacle with an eduction pipe or opening, substantially as set forth.

2. A refrigerator comprising a casing and a lining of light porous wood, arranged to leave a space between them, and a filling in said space, consisting of salt, lime, and sawdust, substantially as set forth.

WILLIAM C. SWEET.

Witnesses:

FREDERICK W. CAMERON,
WALTER E. WARD.